United States Patent [19]

Shimada et al.

[11] Patent Number: 5,166,914
[45] Date of Patent: Nov. 24, 1992

[54] DATA RECORDING/REPRODUCING APPARATUS WITH TWO-DIMENSIONAL EQUALIZER FOR CROSSTALK CANCELLATION

[75] Inventors: Toshiyuki Shimada, Hirakata; Kazuhiro Aoki, Moriguchi; Akira Kurahashi, Yawata; Noboru Kikuchi, Hirakata, all of Japan

[73] Assignee: Matsushita Electric Industrial Co., Ltd., Osaka, Japan

[21] Appl. No.: 454,501

[22] Filed: Dec. 21, 1989

[30] Foreign Application Priority Data

Dec. 21, 1988 [JP] Japan ................. 63-322616

[51] Int. Cl.$^5$ .............................................. G11B 7/00
[52] U.S. Cl. ................................ 369/32; 369/44.34; 369/48; 369/44.26; 360/65
[58] Field of Search ............. 369/88, 174, 163, 32, 369/44.34, 44.29, 56, 48, 49, 44.26; 360/45, 65

[56] References Cited

U.S. PATENT DOCUMENTS 4,064,397 12/1977 Sakaki et al. .
4,564,869 1/1986 Baumeister ....................... 360/65
4,907,100 3/1990 Nishiyama et al. ................ 360/45

FOREIGN PATENT DOCUMENTS

0029550A1 6/1981 European Pat. Off. .
0138274A1 4/1985 European Pat. Off. .
0219037A2 4/1987 European Pat. Off. .
0288114A1 10/1988 European Pat. Off. .
56-111116 (A) 9/1981 Japan .

Primary Examiner—Roy N. Envall, Jr.
Assistant Examiner—Nabil Hindi
Attorney, Agent, or Firm—Wenderoth, Lind & Ponack

[57] ABSTRACT

An equalizer apparatus is applied to a DBF disk recording medium in which a sampling clock is reproduced from clock pits recorded on the disk recording medium. A fixed coefficient equalizer includes an analog to digital converter, a memory and a two-dimension equalizer. The fixed coefficient equalizer suppresses interference from adjacent tracks and reduces the error rate of the reproduced data caused by crosstalk even in the case of a narrow track pitch. Further, by adding to the equalizer a sign detector, a FIR low-pass filter and a coefficient control circuit to form a variable coefficient equalizer, interference fluctuation attributed to the linear recording density, recording power irregularity, light spot shape, tracking error, etc., can be automatically compensated to suppress the equalization error caused by such fluctuation. Further, using the variable coefficient equalizer, clocking timing errors and fluctuations can be automatically and efficiently compensated.

9 Claims, 16 Drawing Sheets

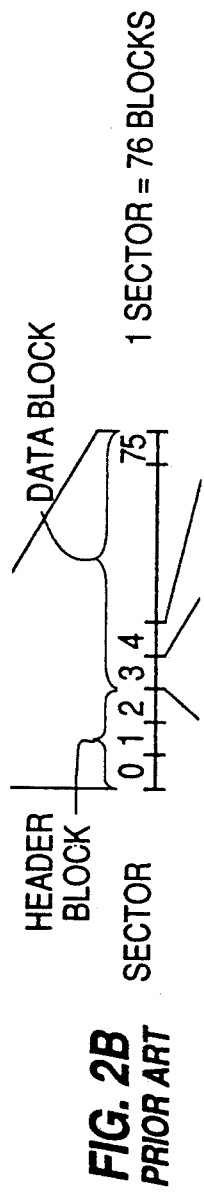
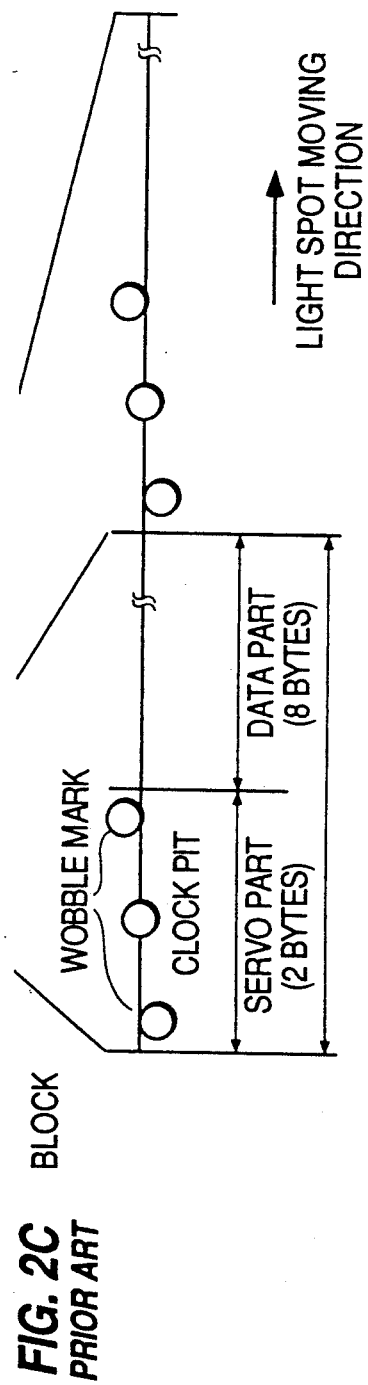
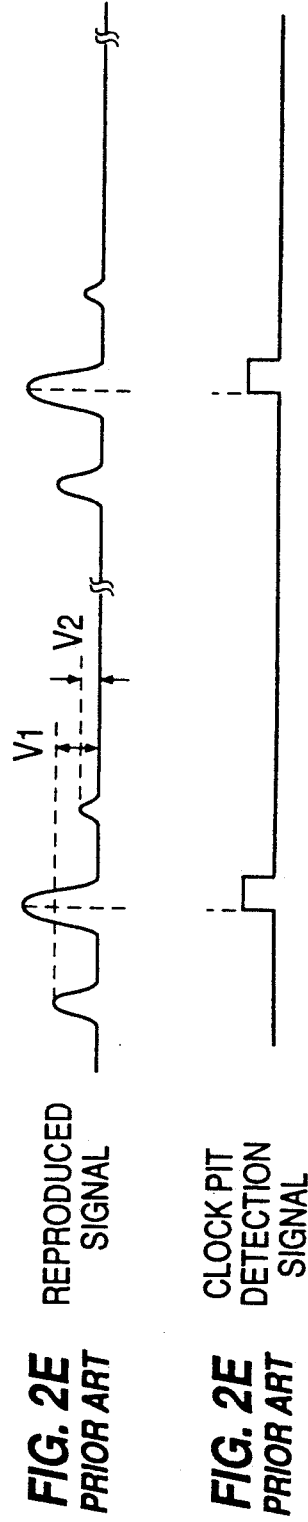
FIG. 2A PRIOR ART  TRACK
FIG. 2B PRIOR ART  SECTOR
FIG. 2C PRIOR ART  BLOCK
FIG. 2E PRIOR ART  REPRODUCED SIGNAL
FIG. 2E PRIOR ART  CLOCK PIT DETECTION SIGNAL

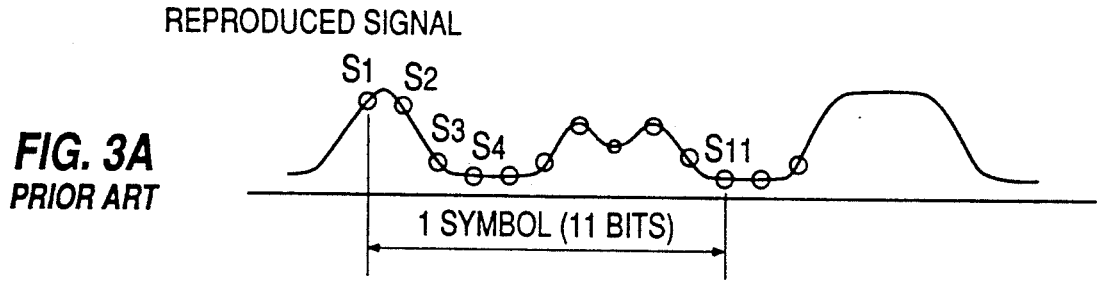
FIG. 3A PRIOR ART
FIG. 3B PRIOR ART
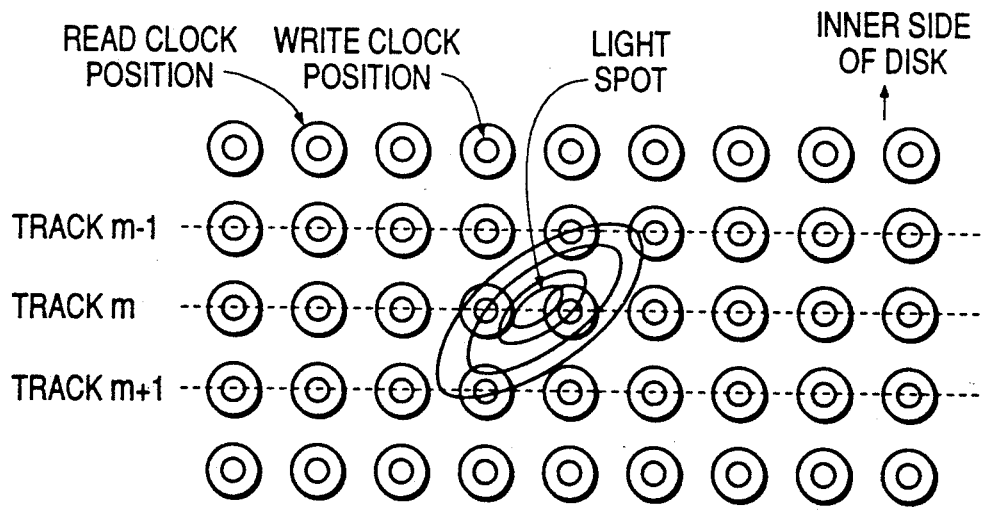
FIG. 5

DATA RECORDING/REPRODUCING APPARATUS WITH TWO-DIMENSIONAL EQUALIZER FOR CROSSTALK CANCELLATION

BACKGROUND OF THE INVENTION

1. Field of the Invention

In recent years, vigorous developments have taken place in the field of optical disk apparatuses for use as recording devices having large capacities. The data format used for recording and reproducing data in an optical disk apparatus is generally classified into two types, a continuous composite servo format type and a Discrete Block servo Format type (hereinafter to be abbreviated as DBF), derived from the detection of a tracking signal of a light spot and a groove configuration on a disk medium. The present invention relates to an equalizer of an optical disk apparatus employing the DBF and to an optical disk recording/reproducing apparatus incorporated with such an equalizer.

2. Description of the Prior Art

Hitherto, DBF has been characterized by its relative ease of tracking signal detection and by the clock detection stability of the recorded and reproduced data, where all timings are detected using clock pits written on the disk.

Referring to the attached drawings, an explanation is given below of the signal reproducing portion of the conventional optical disk recording/reproducing apparatus.

FIG. 1 shows the signal reproducing portion of the conventional magnetooptical disk; FIG. 2 and FIG. 3 are waveform diagrams for illustrating the operation thereof; and FIG. 4 is a circuit diagram of the equalization circuit of the signal reproducing portion of the conventional magnetooptical disk.

In FIG. 1, reference numeral 1 depicts an optical head. The optical head is composed of a laser, a lens, an actuator, a polarized beam splitter, a pin photodiode, a prepit signal reproducing circuit, a magnetooptical signal reproducing circuit, etc. Reference numeral 70 denotes an optical disk having a track 71. Reference numerals 2 and 3 denote peak hold circuits, 4 denotes a subtractor, 5 denotes a differentiator, 6 denotes a PLL, 7 denotes a counter, 8 denotes a switch, 9 denotes an equalization circuit, 10 denotes an address decoder, and 11 denotes a system controller. Reference numeral 72 denotes a clock reproducer composed of the differentiator 5, the phase locked loop circuit 6, and the counter 7. Reference numeral 33 denotes a servo signal extractor composed of the peak hold circuits 2, 3 and the subtractor 4.

In FIG. 4, reference numeral 12 denotes an analog to digital converter, reference numerals 13-15 denote D flip-flops (hereinafter to be abbreviated as D-FFS), 16-18 denote multipliers, and reference numerals 19 and 20 denote adders.

The optical head 1 outputs a focus error signal in accordance with an optical spot formed on the magnetooptical disk 70 and outputs addresses, wobble marks and clock-pits unevenly recorded, as shown in FIG. 2, as pre-recording signals in accordance with a change in reflected light intensity.

The data recording and reproducing format of a 3.5 inch magnetooptical disk is explained with reference to FIG. 2 showing an enlargement of the track 71 of the disk 70 shown in FIG. 1. As shown in FIGS. 2(a)-(c), the data recording and reproducing format in the 3.5 inch magnetooptical disk is formed by dividing one circular track into 22 sectors, each sector comprising 76 blocks. Among the 76 blocks, the 0th block thru second block are the header blocks and include addresses of the sector mark, sector number, and track number. The third block thru 75th block are the data blocks, each data block comprising two servo-bytes and eight data bytes. The servo-bytes are composed of wobble marks for tracking error detection and clock-pits for clock reproduction, as shown in FIG. 2(c). Referring to FIG. 1, the differentiator 5 differentiates the input clock-pit signal and outputs it. The phase locked loop circuit 6, which has a free running frequency which is 110 times the repeating frequency of the clock-pit signal, accepts the differentiator 5 output only in the vicinity of the reproduction timing of the clock-pit signal in accordance with indication signal of the counter 7, and performs phase comparison of the reproduced clock output with the signal obtained by dividing the reproduced clock output into 110 sections using the counter 7 and synchronizes the same. The counter 7 is a 110 divisional counter, as mentioned above, which divides the aforementioned reproduced clock into 110 sections and at the same time outputs a timing indication signal of the clock pit and a timing indication signal of the wobble marks. By the above-mentioned operations, the clock reproducer 72 reproduces the clock.

The peak hold circuits 2 and 3 hold as outputs the maximum values V1 and V2 as in FIG. 2(d) of the wobble mark signals in accordance with the timings indicated by the counter 7, and the subtractor 4 outputs the difference between the peak hold circuits 2 and 3 as a tracking error signal. In this manner, the servo signal extractor 88 outputs the tracking error signal.

The address signal and the magnetooptical signal are recorded and reproduced in 4-11 modulation. In the 4-11 modulation, the data in the length of 11 bits is allocated to one symbol of a length of 1 byte before modulation, and its rule modulation is such that the number of the code "1" after the modulation becomes four in the one symbol of 11 bits. Accordingly, to 8 bytes of the data section in one block, the data of 88 bits are recorded and reproduced. This state corresponds to 110 bits in length of one block.

The write-in clock to be used for recording the magnetooptical signal is a reproduced clock reproduced from the aforementioned clock-pit, and similarly, for equalization and identification of data, the aforementioned reproduced clock is used. The address signal and the data signal outputted from the optical head 1 are applied to the switch 8. The switch 8 changes over between the address signal and the data signal in response to a switching signal generated by the system controller 11.

A circuit diagram of the equalization circuit 9 is shown in FIG. 4. The output of the switch 8 is inputted to the analog to digital (AD) converter 12. The AD converter 12 converts the analogue address signal and optical magnetic signal into digital signals. The sampling signal used is the reproduced clock of the phase locked loop circuit 7. The clocks applied to D-FFS 13-15 are also the aforementioned reproduced clock. The D-FFS 13-15 generate the sequentially one reproduced clock cycle delayed outputs of AD converter 12 to the multipliers 16-18. The multipliers 16-18 multiply the thus delayed signals by coefficients W(−1)-W(1) and output the multiplied results to the adders 19 and 20. D-FFs 13–15, multipliers 16–18, adders 19 and 20 constitute a 3-tap transversal filter having a transfer function H1 expressed as:

$$H1 = W(-1)\cdot X(n+1) + W(0)\cdot X(n) + W(1)\cdot X(n-1)$$

The transfer characteristics vary according to the coefficients of the multiplier 16–18. The equalization circuit 9 has the effect of suppressing wave interference of adjacent bits of the reproduced signal S6–S8 as shown in FIG. 3(a). The address decoder 10 detects the address signal from the equalization circuit 9 and demodulates the current address. The system controller 11 receives the output of the address demodulator 10 and generates the changeover signal to the switch 8 for changing over between the address signal and the data signal.

One characteristic of the optical disk resides in its large memory capacity. Due to the fact that the linear density is equivalent to that of the magnetic disk apparatus and is more than 20 Kbpi, and due to the fact that the inter-track pitch of the recording track is as small as about 1.6 microns, a large recording density can be obtained. However, a demand for even higher density recording has arisen. To satisfy this demand, the linear density can be increased and the resultant wave interference reduced using the equalization circuit of the conventional data reproducing device. Further, it may also be considered to narrow the track pitch to thereby increase the recording density. However, when the track pitch is 1 micron or less, the crosstalk from adjacent tracks increases. The equalization circuit of the signal reproduction portion of the conventional magnetooptical disk apparatus, however, does not at all address the interference received from adjacent tracks, and thus limits the attainment of a high recording density.

SUMMARY OF THE INVENTION

An object of the present invention is to provide a novel two-dimensional fixed coefficient equalizer and variable coefficient equalizer for suppressing the wave interference from adjacent tracks, and to provide a recording disk data recording/reproducing apparatus using such a two-dimensional equalizer.

In order to attain the above object, a data recording/reproducing apparatus for writing/reading data onto and/or from a disk recording medium includes an equalizer portion comprising: an analog to digital converter for sampling, quantitizing and outputting reproduced signals from the disk recording medium; a memory for storing signal trains of a plurality of tracks outputted from said analog to digital converter; and a wave equalizer for reading out simultaneously the signal trains of a plurality of tracks stored in said memory and performing equalization with respect to both of an interference in the lengthwise direction of each track and on interference from adjacent tracks.

By the above configuration, wave interference from adjacent tracks is suppressed to minimize the reproduced data error rate caused by crosstalk even in the case where the track pitch is narrow. Further, by forming the equalizer as a variable coefficient equalizer, wave interference fluctuations attributed to the linear recording density, irregularities in the recording power, the optical spot, the tracking error, etc., are automatically corrected and suppressed. Furthermore, the variable coefficient equalizer may be configured to automatically and efficiently correct any error and fluctuation of the clock timing.

BRIEF DESCRIPTION OF THE DRAWINGS

FIGS. 2(a)–(e) and FIGS. 3(a)–(b) are waveform diagrams for illustrating the operation thereof;

FIG. 5 is an illustrative view of an optical spot shape;

Hereinafter, in these drawings, the components having the same functions as discussed above with respect to the conventional apparatus are indicated by the same reference numbers and explanations thereof are omitted.

DESCRIPTION OF THE PREFERRED EMBODIMENTS

An explanation of the first embodiment of the fixed coefficient equalizer section according to the present invention is discussed below with reference to the block diagram of FIG. 8 and the circuit diagram of the equalizer of FIG. 9.

Figure 8:
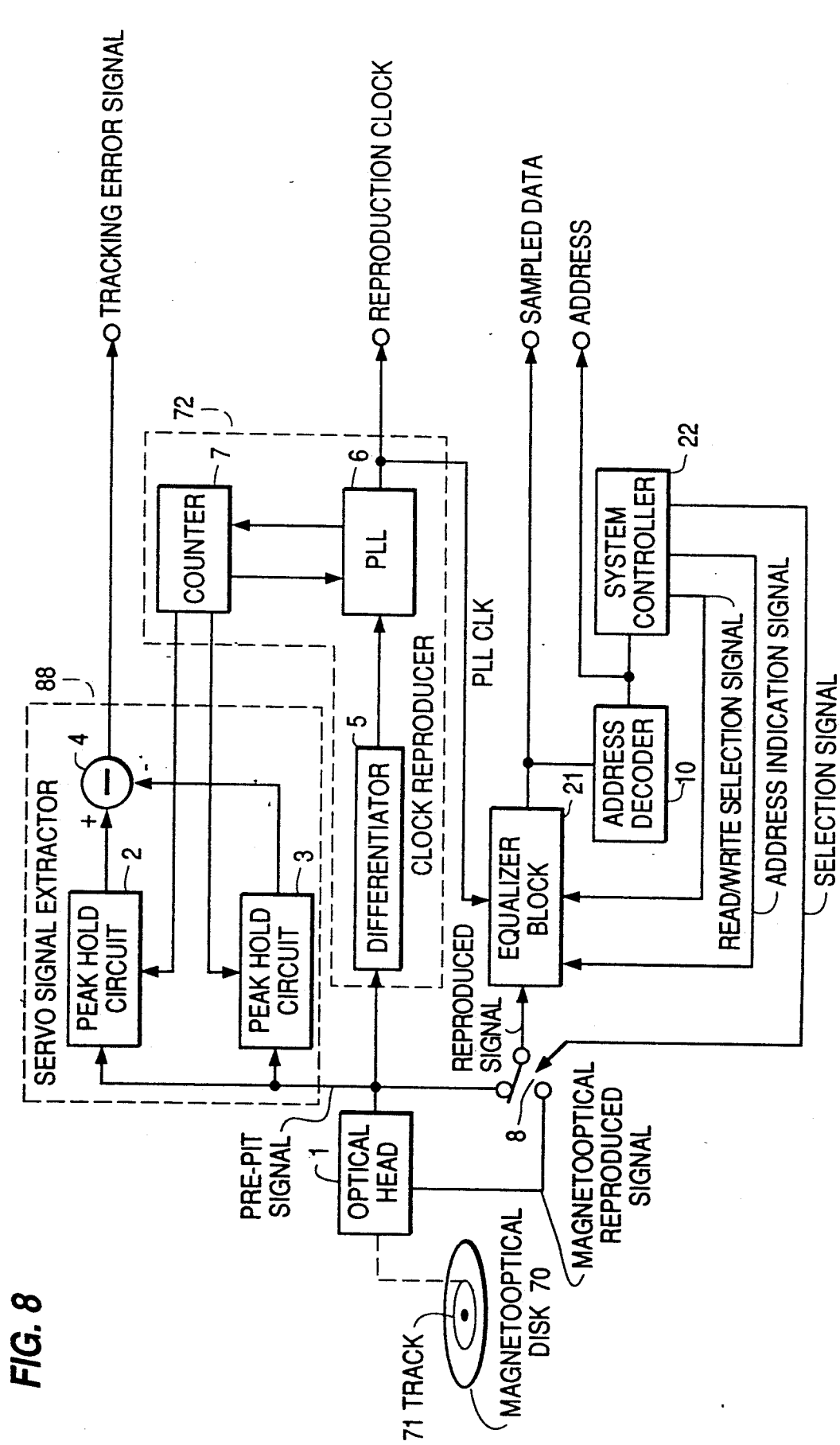
FIG. 8 is a block diagram of the data reproducing portion of the present invention embodiment.

In FIG. 8, reference numeral 1 denotes an optical head. Further, reference numeral 70 denotes a magnetooptical disk, 71 denotes a track, 2 and 3 denote peak hold circuits, 4 denotes a subtractor, 5 denotes a differentiator, 6 denotes a phase locked loop circuit, 7 denotes a counter, 8 denotes a switch, 21 denotes an equalizer section, 10 denotes an address decoder, 22 denotes a system controller, and 72 denotes a clock reproducer composed of the differentiator 5, the phase locked loop circuit 6 and the counter 7. Reference numeral 88 denotes a servo signal extractor composed of the peak hold circuits 2, 3 and the subtractor 4. These components are the same in the remaining embodiments as well.

In FIG. 8, the clock reproducer 72 generates a reproduced clock from the clock pits contained in the recording disk in the same manner as in the convention embodiment.

Similarly, the servo signal extractor 88 outputs a tracking error signal from the maximum values V1 and V2 of the wobble mark signals as shown in FIG. 2(d). The address signal and the data signal outputted from the optical head 1 are applied to the switch 8. The switch 8 changes over between the address signal and the data signal according to the changeover signal from the system controller 22. The equalizer section 21 carries out equalization using the output from the phase locked loop circuit 6, and the RAM read/write selection signal and the RAM address indication signal from the system controller 22. The address decoder 10 detects the address signal contained the output of the equalizer section 21 and decodes the current address. The system controller 22 receives the output of the address decoder 10 and generates the selection signal to the switch 8 for changing over between the address signal and the data signal, and further generates the RAM read/write selection signal and the RAM address indication signal to the equalizer section 21. As for the equalizer section 21 of FIG. 8, a circuit diagram of a first embodiment of a fixed coefficient equalizer is shown in FIG. 9.

Figure 9:
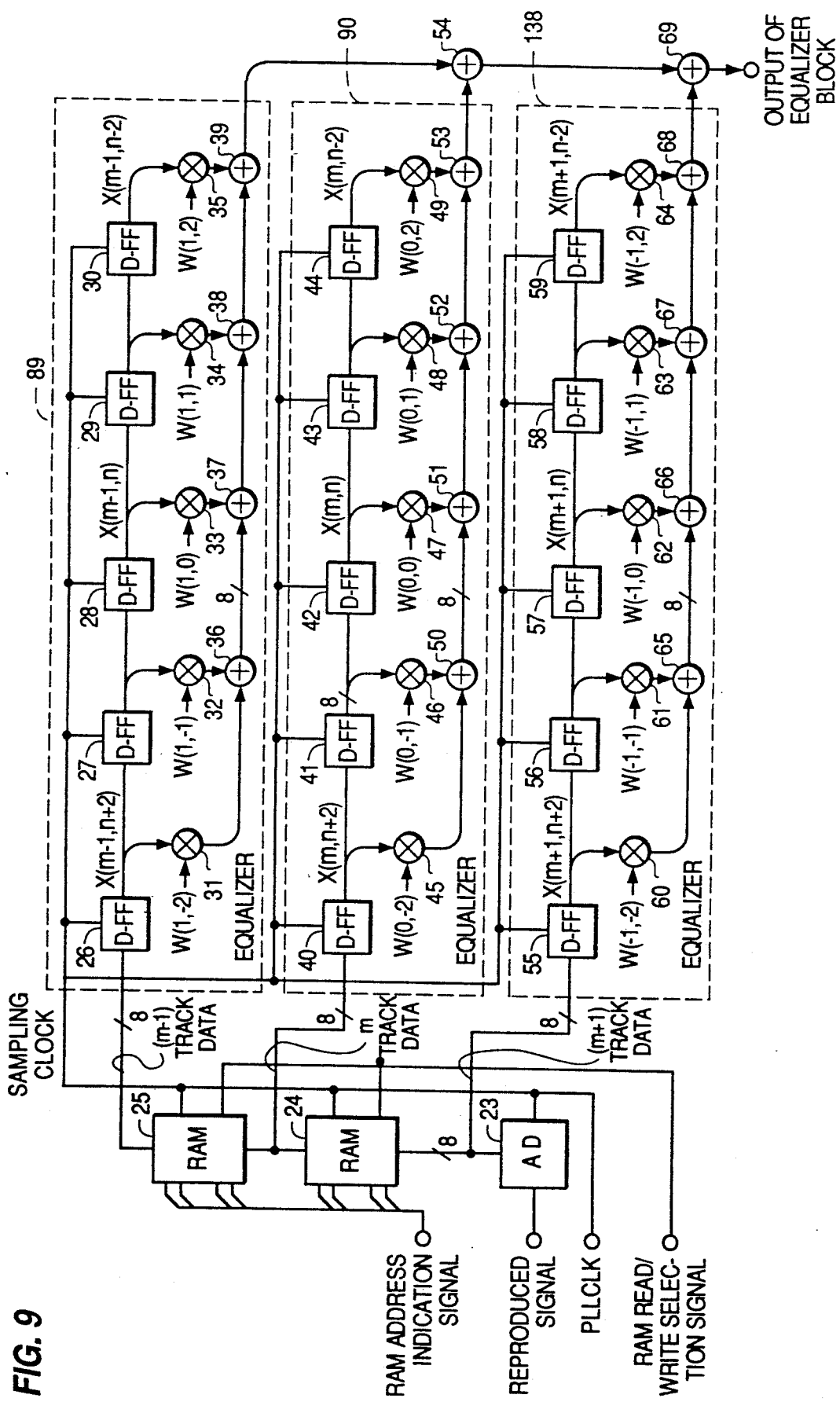
FIG. 9 is a circuit diagram of the first embodiment of the fixed coefficient equalizer according to the present invention.

The fixed coefficient equalizer of FIG. 9 includes an analog to digital converter 23, RAMs 24 and 25, D-FFS 26-30, 40-44, 55-59, multipliers 31-35, 45-49, 60-64 and adders 36-39, 50-54, 65-69. Reference numeral 89 denotes an equalizer circuit composed of D-FFS 26-30, multipliers 31-35 and adders 36-39. Reference numeral 90 denotes an equalizer circuit composed of D-FFS 40-44, multipliers 45-49 and adders 50-53. Reference numeral 138 denotes an equalizer circuit composed of D-FFS 55-59, multipliers 60-64 and adders 65-68.

In FIG. 9, the analog to digital converter 23 effects analog to digital conversion of the address signal and the data signal by converting the analog signals output from the switch 8 into digital signals. The analog to digital converter 23 employs an output of the phase locked loop circuit 8 as a sampling clock. The frequency of the reproduced clock signal is the same as the channel bit rate of the recorded and reproduced data. The analog to digital converter 23 provides an 8 bit output which is stored in RAMs 24 and 25. The memory capacity of each of the RAMs 24 and 25 is sufficient to record the data of 1 track. The RAMs 24 and 25 employ the output of the phase locked loop circuit as a clock and change over between reading and writing of data in response to the RAM read/write selection signal output by the system controller 22. Also, the read/write addresses of the RAMs 24 and 25 are established in accordance with the RAM address indication signal also output by the system controller 22.

Optimal equalization of the mth track will now be explained.

When the RAM 24 outputs the previously stored data of the mth track, the RAM 25 outputs the previously stored data of a track just prior to the mth track, i.e. the data of the (m−1)th track. Also, at this time, the AD converter 23 outputs the data of the (m+1)th track.

The equalizers circuits 89, 90 and 138 are 5-tap transversal filters. The equalizer circuit 89 performs equalization of the data of the (m−1)th track to cancel crosstalk from the (m−1)th track, the equalizer circuit 90 performs equalization of the data of the mth track, and the equalizer circuit 138 performs equalization of the data of the (m+1)th track to cancel crosstalk from the (m=1)th track. The adder 54 adds the outputs of the equalizer circuit 89 and the equalizer circuit 90, and the adder 69 adds the outputs of the aforementioned adder 54 and the equalizer circuit 138.

Figure 1:
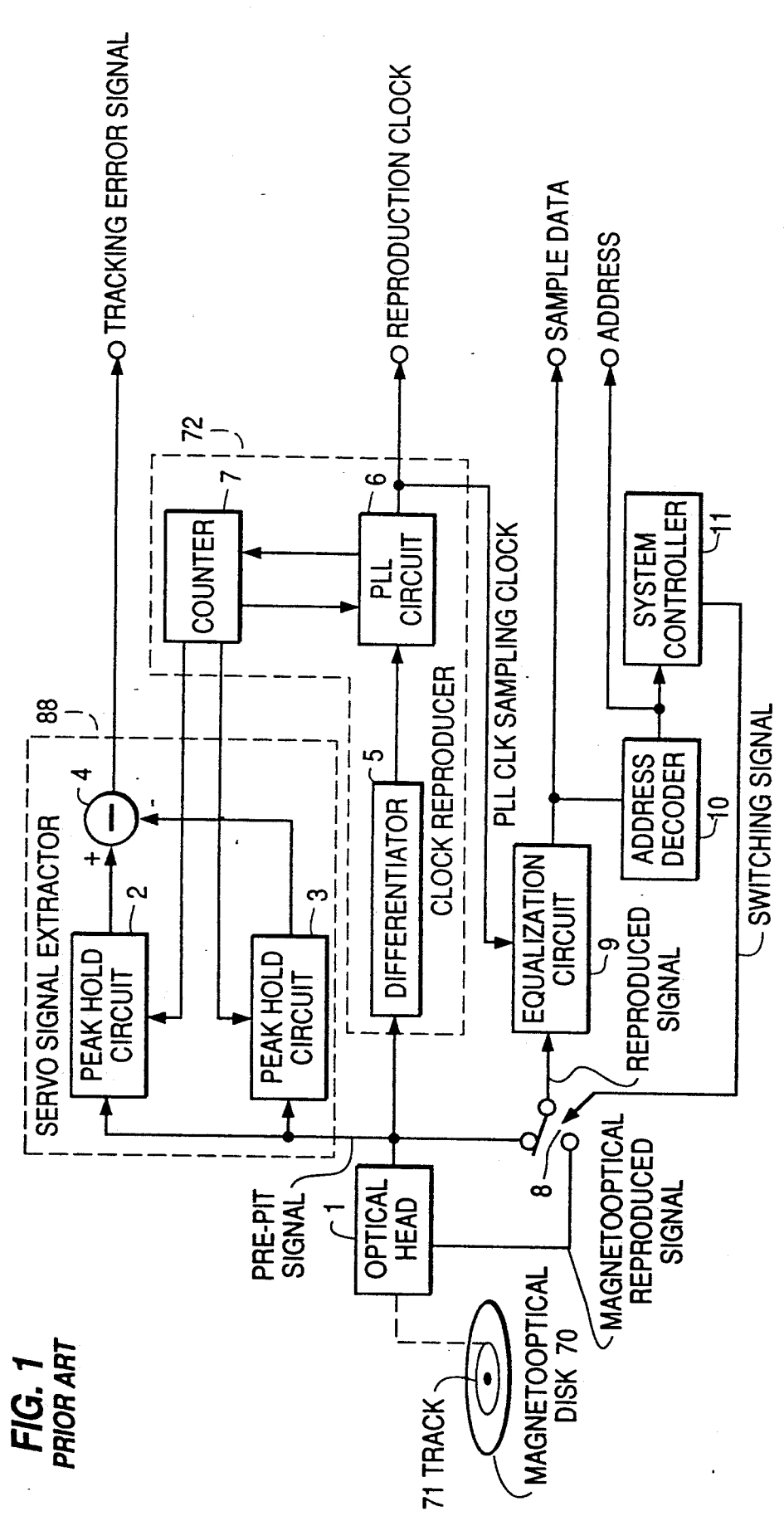
FIG. 1 is a signal reproducing portion of the conventional magnetooptical disk.
Figure 4:
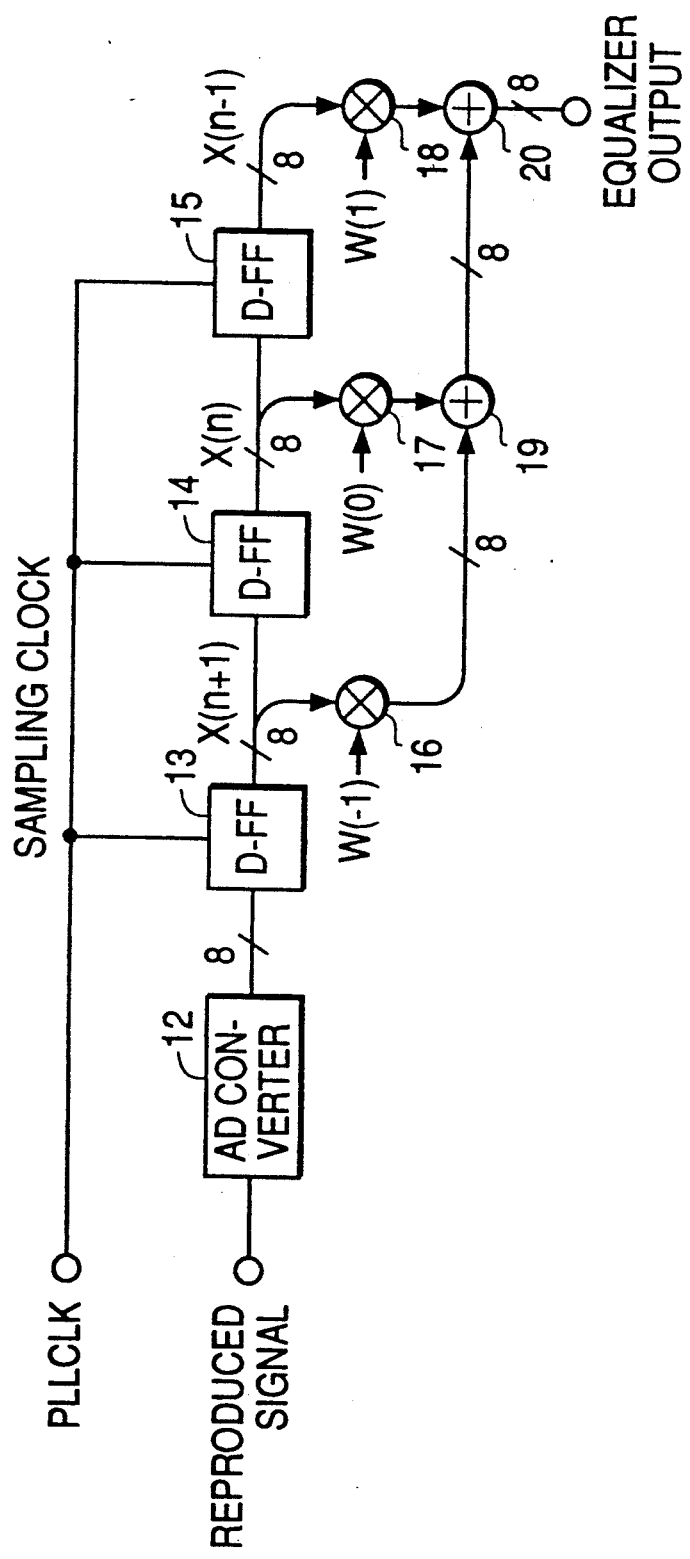
FIG. 4 is a circuit diagram of an equalization circuit of the signal reproducing portion of the conventional magnetooptical disk.
Figure 6:
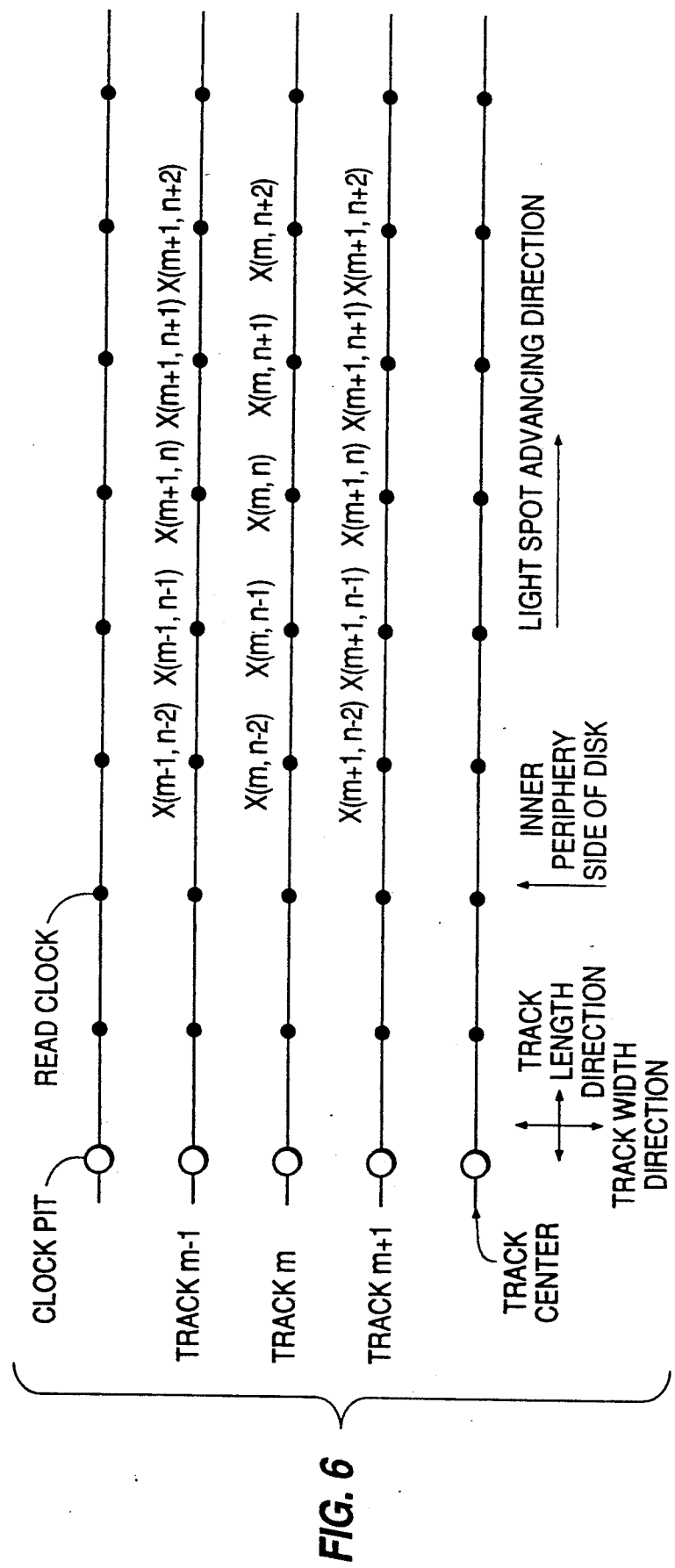
FIG. 6 is an illustrative view of two dimension disposition of sampling of the reproduced signal.

FIG. 6 is an illustrative view of the two dimension arrangement of the sampling of the reproduced signal. In FIG. 6, the white circles represent the clock-pits and the black circles signify the positions of the read-out clocks.

As shown in FIG. 6, when the 3×5-tap coefficient matrix for obtaining the equalization output from the sample value matrix for 5 units per 1 track and the adjacent 3 track portions X(m,n)(m=i−1, i, i+1, n=j−1, j, j+1) is assumed to be W(k,l) (k=−1, 0, 1, l=−2, −1, ..., 2), the output y(m,n) of the equalizer of FIG. 9 is:

$$y(m, n) = \sum_{k=-1}^{1} \sum_{l=-2}^{2} W(k, l) \cdot X(m - k, n - l) \quad (1)$$

The equalized signal y(m,n) is computed at the nth clock timing which corresponds to the sampling timing of the (m+1)th track read signal.

FIG. 5 is an illustrative view of the optical spot shape, in which the central ellipse shows the intensity distribution of the optical spots, and in which the larger circles show the read clock positions and the smaller circles show the write clock positions.

As shown in FIG. 5, the tap coefficient W(k, l) of the equalizer block is determined according to factors such as optical spot shape, the recorded pit shape, etc.. In general, the optical spot shape, in which the intensity distribution can be approximated by Gaussian distribution, is the dominant factor, whereby the coefficient matrix W(k, l) becomes:

$|W(k,0)| > |W(k,\pm 1)| > |W(k,\pm 2)| k=-1,0,1 |W(-0,1)| > |W(\pm 1,l)| l=-2,-1,...2$ where, | | denotes absolute value.

By selecting the coefficient matrix as the above W(k, l), the equalizer circuit 89 and the equalizer circuit 138 operate to suppress the crosstalk between the adjacent tracks, and the equalizer circuit 90 operates to perform optimum equalization of the data of the mth track.

By the above-mentioned configuration of the two-dimensional equalizer section, a fixed coefficient equalizer and an optical disk recording/reproducing apparatus employing such a fixed coefficient equalizer are realized in which both the interference from adjacent tracks and interference from adjacent bits are suppressed to achieve optimum equalization, and thus, even in the case of a narrow track pitch, the error rate of the reproduced data caused by crosstalk can be reduced.

An explanation is now given of a second embodiment of a fixed coefficient equalizer of the present invention in which the optical spot shape is symmetric with respect to the lengthwise direction and the widthwise direction of the tracks.

Figure 10:
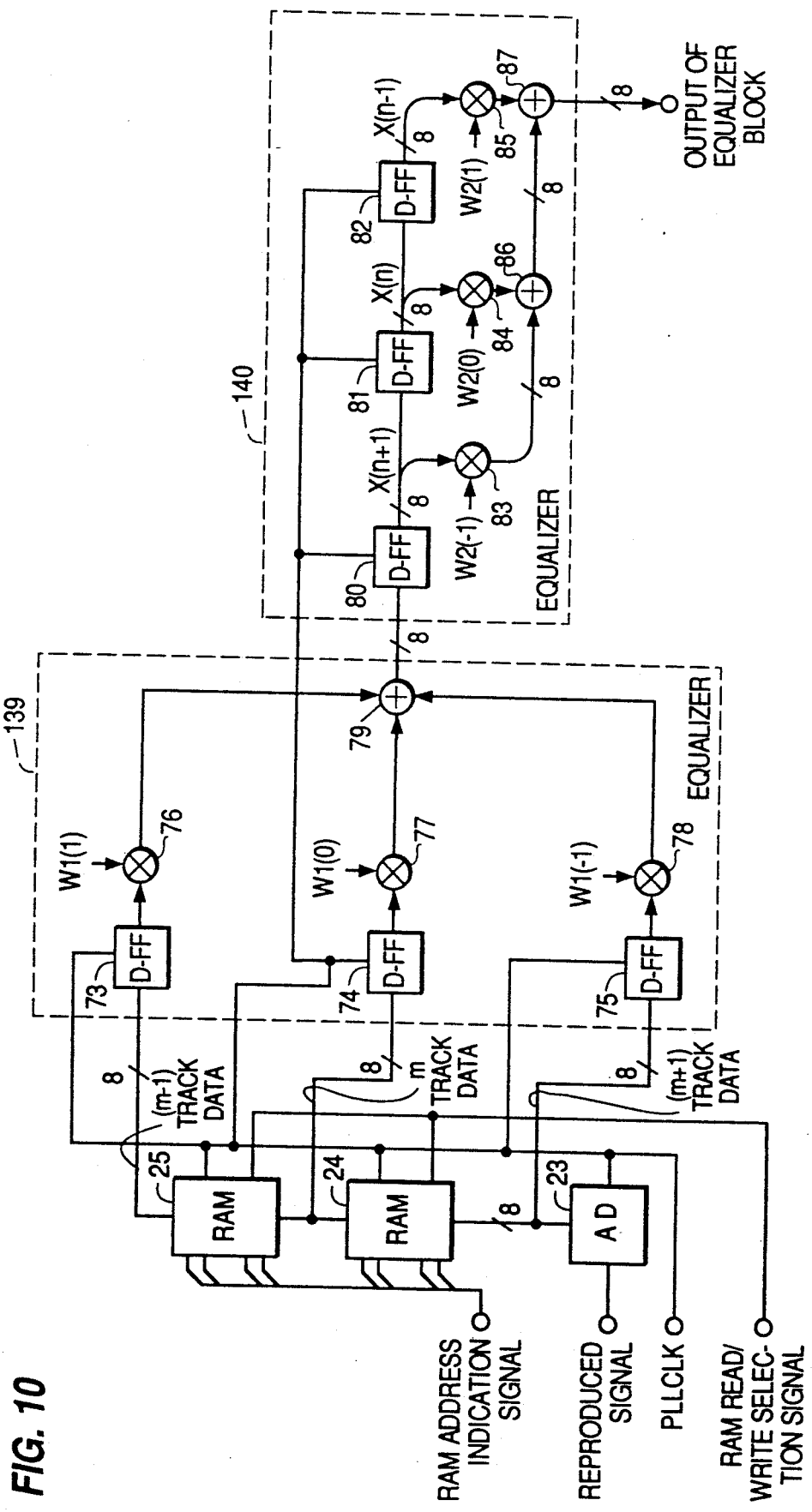
FIG. 10 is a circuit diagram of the second embodiment of the fixed coefficient equalizer according to the present invention.

FIG. 10 shows a circuit diagram of the second embodiment of a fixed coefficient equalizer employed as the equalizer section 21 shown in FIG. 8.

The fixed coefficient equalizer of FIG. 10 includes D-FFs 73-75 and 80-82, multipliers 76-78 and 83-85, and adders 79, 86, and 87. Reference numeral 139 denotes an equalizer circuit composed of the D-FFs 73-75, the multipliers 76-78 and the adder 79. Reference numeral 140 denotes an equalizer circuit composed of the D-FFs 89-82, the multipliers 83-85 and the adders 86 and 87. The equalizers circuits 139 and 140 are each composed as a 3 tap transversal filter.

When the intensity distribution of the light spot is symmetrical with respect to the lengthwise direction and the widthwise direction, the coefficient matrix W(k, l) becomes:

$$W(k, l) = W1(k) \cdot W2(l) \qquad (2),$$

so that the two-dimensional coefficient W(k, l) is separable into a lengthwise direction coefficient W1(k) and a widthwise direction coefficient W2(l). Accordingly, the equalizer is separable in the lengthwise direction and the widthwise direction of the track, and the output y(m, n) of the equalizer section 21 becomes:

$$y(m, n) = \sum_{k=-1}^{1} W1(k) \cdot \sum_{l=-1}^{1} W2(l) \cdot X(m - k, n - l) \qquad (3)$$

where $k = -1, 0, +1, l = -1, 0, +1$

The equalizer 139 circuit operates to eliminate crosstalk from the adjacent tracks, and the equalizer circuit 140 operates to eliminate the interference from adjacent bits in the lengthwise direction of the track.

By the above-mentioned construction, a fixed coefficient equalizer having a simple configuration and an optical disk recording/reproducing apparatus employing such a fixed coefficient equalizer are realized in which, when the intensity distribution of the light spot is symmetrical with respect to the lengthwise direction and the widthwise direction of the track, the interference from adjacent tracks and the interference from adjacent bits are suppressed to achieve optimum equalization, and thus, even in the case of a narrow track pitch, the error rate of the reproduced data caused by crosstalk can be reduced.

The multiplier coefficients of the above embodiments are maintained in a fixed state. However, by adaptively varying such coefficients, the equalization characteristics can be further improved.

Reference is again made to the light spot shape illustrated in FIG. 5. In the swing arm supporting type optical system, for example, the axis of the elliptical light spot intensity distribution shown in FIG. 5 frequently varies according to the position (i.e. address) on the recording and reproducing disk, and in other systems as well, the linear recording density varies according to the disk address. Therefore, it becomes necessary to frequently vary the coefficients of the equalizer. The causes of such variation of the two-dimensional recording and reproducing characteristics are summarized below with reference to FIG. 7.

Figure 7:
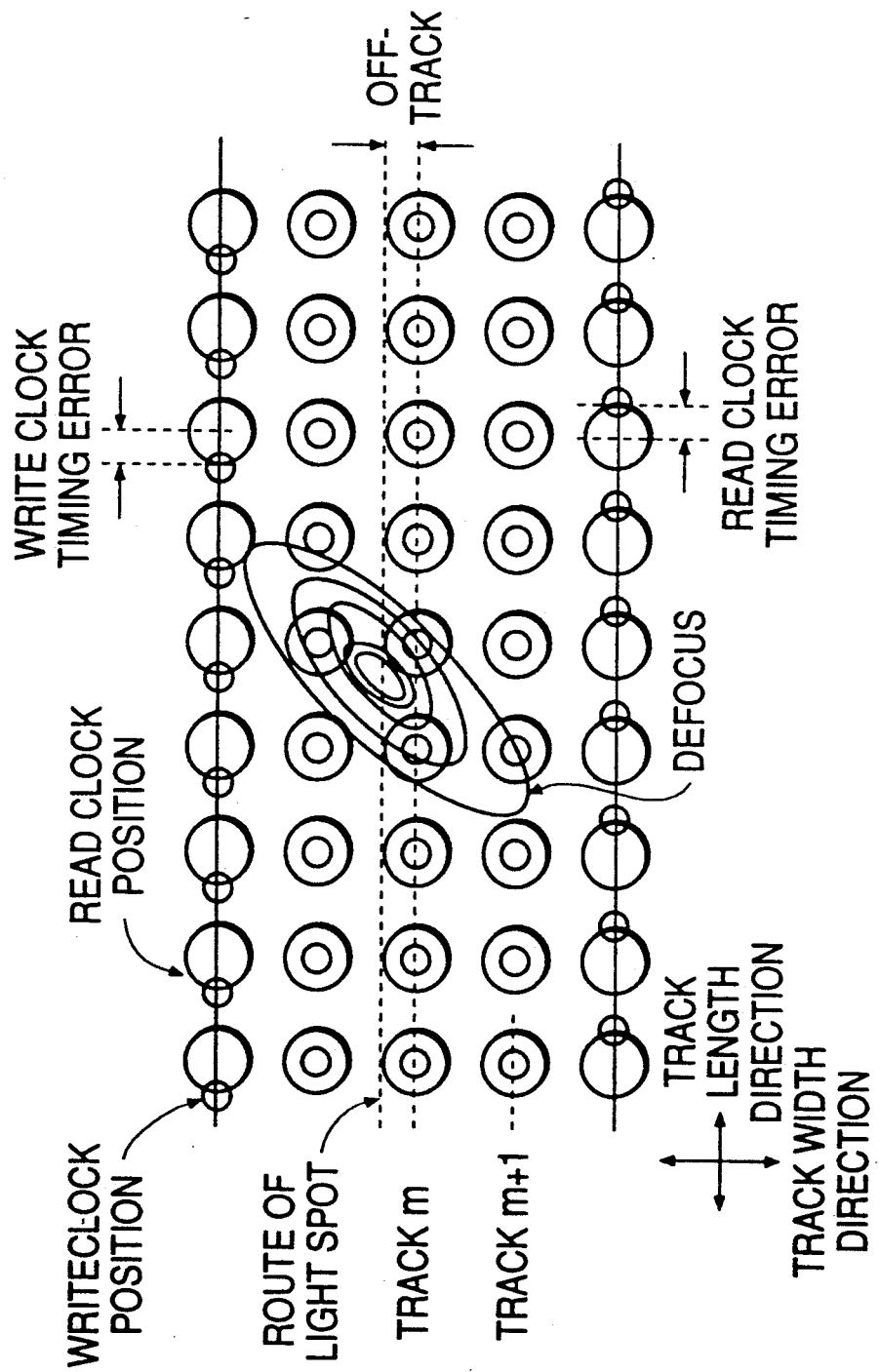
FIG. 7 is an illustrative view of factors causing fluctuation of the wave interference.

As shown in FIG. 7, the factors for determining the equalization characteristics are mainly classified into the light spot shape related to the conditions in recording, recording power, recording clock timing, focus, shape of recording pit and position thereof formed by fluctuation of tracking, and the light spot shape related to the condition in reproducing, tracking, focus, and adjacent symbols and intersymbol interference in the track direction by variation of sampling clock timing. Accordingly, by giving an adequate desired signal, adapting of the coefficients to suppress interference by adaptively following these variations becomes possible. As this adaptive algorithm, there can be applied the Least Mean Square error method (LMS method) (e.g., literature: B. Widrow, S. D. Stearns, "Adaptive Signal Processing", Prentice-Hall, 1985), and the like extensively used in general applications. As the desired signal which becomes necessary here, the equalized output is sign detected, and, based on the result thereof, a determination may be made in consideration of the non-distortion condition of the inter-symbol interference according to the modulation system in use.

Hereinafter, the first embodiment of a variable coefficient equalizer is described.

Figure 11:
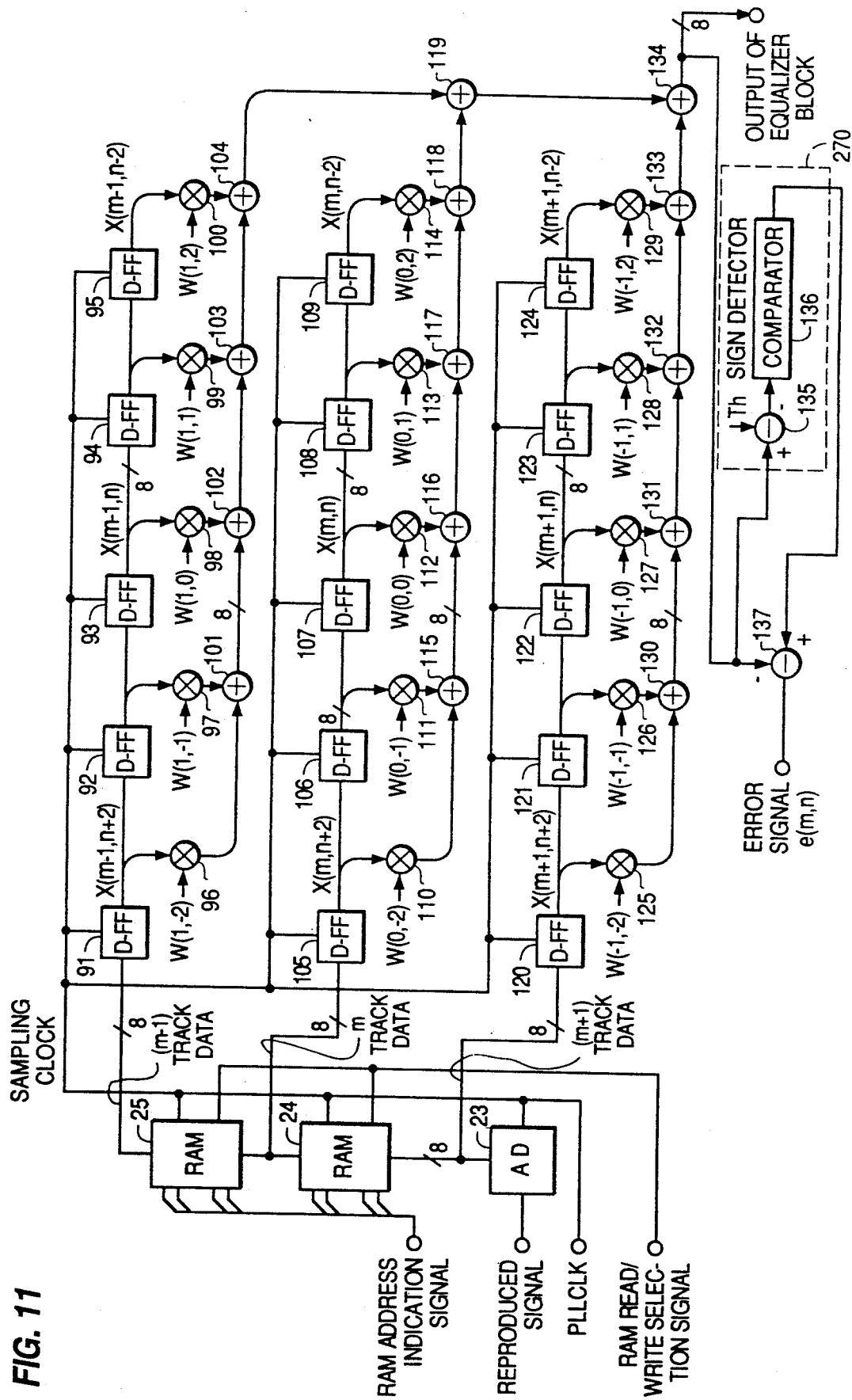
FIG. 11 is a circuit diagram of the first embodiment of the variable coefficient equalizer according to the present invention.
Figure 13:
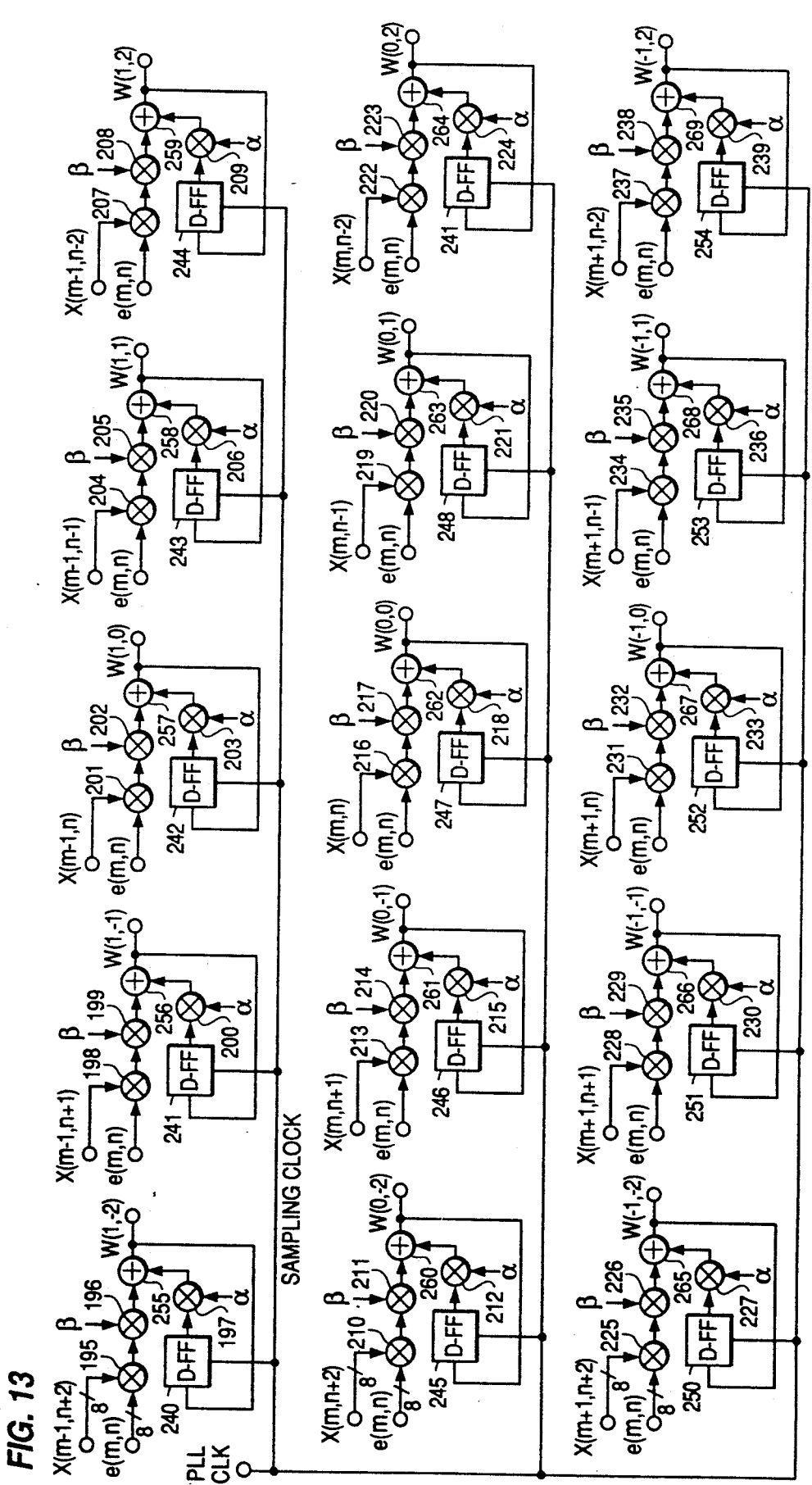
FIG. 13 is a circuit diagram of the coefficient control circuit of the first and the second embodiments of the variable coefficient equalizer according to the present invention.

FIG. 11 is a circuit diagram of the first embodiment of the variable coefficient equalizer, and FIG. 13 is a circuit diagram of the coefficient control circuit of the first embodiment of the variable coefficient equalizer.

The variable coefficient equalizer of FIG. 11 includes D-FFs 91-95, 105-109 and 120-124, multipliers 96-100, 110-114 and 125-129, adders 101-104, 115-119 and 130-134, a comparator 136, and subtractors 135 and 137. Reference numeral 270 denotes sign detector 270 composed of the subtractor 135 and the comparator 136.

In FIG. 13, reference numerals 195-239 denote multipliers, reference numerals 240-254 denote D-FFs, and reference numerals 255-269 denote adders.

In FIG. 11, the basic equalizer unit composed of D-FFs 91-95, 105-109 and 120-124, multipliers 96-100, 110-114 and 125-129, and adders 101-104, 115-119 and 130-134 is the same as that shown in FIG. 9. The sign detector 270, which functions as a decision device of the variable coefficient equalizer, includes the subtractor 135 having a threshold level Th, and detects the sign of the original modulation signal from the relation between Y(m, n) and Th, and outputs a(m, n)[a(m, n)=0, 1]. In this case, when the adaptation of the equalization characteristic is insufficient, there is a possibility that the decision error to become large, thus having an effect on the convergence characteristic of the adaptive algorithm. However, it is known that ultimately the equalization characteristic converges to a vicinity of the optimum characteristic. The desired signal to the sign detector output a(m, n) is assumed to be d(m, n). The non-distortion condition of the intersymbol interference of the present invention is assumed to satisfy Nyquist's first basis with respect to either the lengthwise direction or the widthwise direction of the track. (cf. Literature; W. R. Boennet, J. R. Davey, "Data Transmission" McGraw-Hill, 1965). In this case, the relation becomes:

$$d(m, n) = a(m, n) \qquad (4)$$

Accordingly, as the desired signal d(m, n), the error signal of the equalization e(m, n) may be operated using the sign detector output a(m, n). In other words, the subtractor 137 outputs the difference between the equalizer output y(m, n) and the desired signal a(m, n) as an error signal e(m, n):

$$e(m, n) = d(m, n) - y(m, n) = a(m, n) - y(m, n) \qquad (5)$$

The coefficient control circuit of FIG. 13 functions to change over the 3×5 coefficient matrix W(k, l) of the equalization circuit of FIG. 11.

The coefficient control circuit of FIG. 13 realizes the adaptive algorithm of the LMS method, in which, in order to minimize the square average of the error signal e(m, n) of the equalizer of FIG. 11, the coefficient matrix is renewed at every clock timing according to the following equation. (cf. Literature: M. M. Hadhoud, D. W. Thomas, "The Two-Dimensional Adaptive LMS (TDLMS) Algorithm", IEEE Transactions on Circuits and Systems, vol. 35, No. 5, May 1988, pp. 485-494).

$$W(k, l)^{(n+1)} = W(k,l)^{(a)} + 2 \cdot \mu \cdot e(m,n) \cdot X(m-k, n-l) \quad (6)$$

$k = -1, 0, 1 \quad l = -2, -1, 0, \ldots, 2$ where, $\mu$ denotes a convergence coefficient $(>0)$, and $W(k,l)^{(n)}$ is the tap coefficient in the nth iteration.

In FIG. 13, the above equation is realized by a D-FF, multipliers, and an adder for each coefficient. In the actual circuit, $W(k,l)^{(n)}$ is multiplied by $\alpha$ to be $W(k,l)^{(n+1)}$ in order to improve the stability of the circuit. Further, the coefficient $(2 \cdot \mu)$ is denoted by $\beta$.

$$0 < \alpha \leq 1, (2 \cdot \mu) = \beta \quad (7)$$

It is noted that $\alpha = 1$ in equation (6).

As is apparent from FIG. 13, the D-FF 240 holds the coefficient $W(1, -2)^{(n)}$ which is used to compute the error signal $e(m, n)$ as shown in FIG. 11 at the nth clock timing. The multiplier 197 outputs the first term of the right hand side of the equation (b) having been multiplied by the compensation factor 1. The multiplier 195 multiplies the error signal $e(m, n)$ by the sample $X(m, -1, n+2)$. The multiplier 196 outputs the second term of the right hand side of the equation (6). The adder 255 outputs the renewed coefficient $W(1, -2)^{(n+1)}$, which will be used for the next iteration. Likewise, the coefficients $W(k, l)^{(n)}$ $(k = -1, 0, 1, l = -2, -1, 0, \ldots, 2)$ at the nth clock timing are renewed to be $W(k, l)^{(n+1)}$, which will be used for the next iteration.

By the above configuration, in addition to the reduction of intersymbol interference in the track attained by the conventional method, the interference from adjacent tracks can also be suppressed, and thus, in the case of a narrow track pitch, the reproduced data error rate caused by crosstalk can be reduced. Also, a variable coefficient equalizer and an optical disk recording/reproducing apparatus employing such a variable coefficient equalizer are realized in which the interference fluctuation attributed to the linear recording density, recording power irregularity, light spot shape, tracking error, etc., is automatically compensated to thereby suppress the equalization error increase caused by such fluctuation.

A second embodiment of the variable coefficient equalizer of the present invention is now described in which the signal to noise ratio is improved in comparison with the first embodiment.

Figure 12:
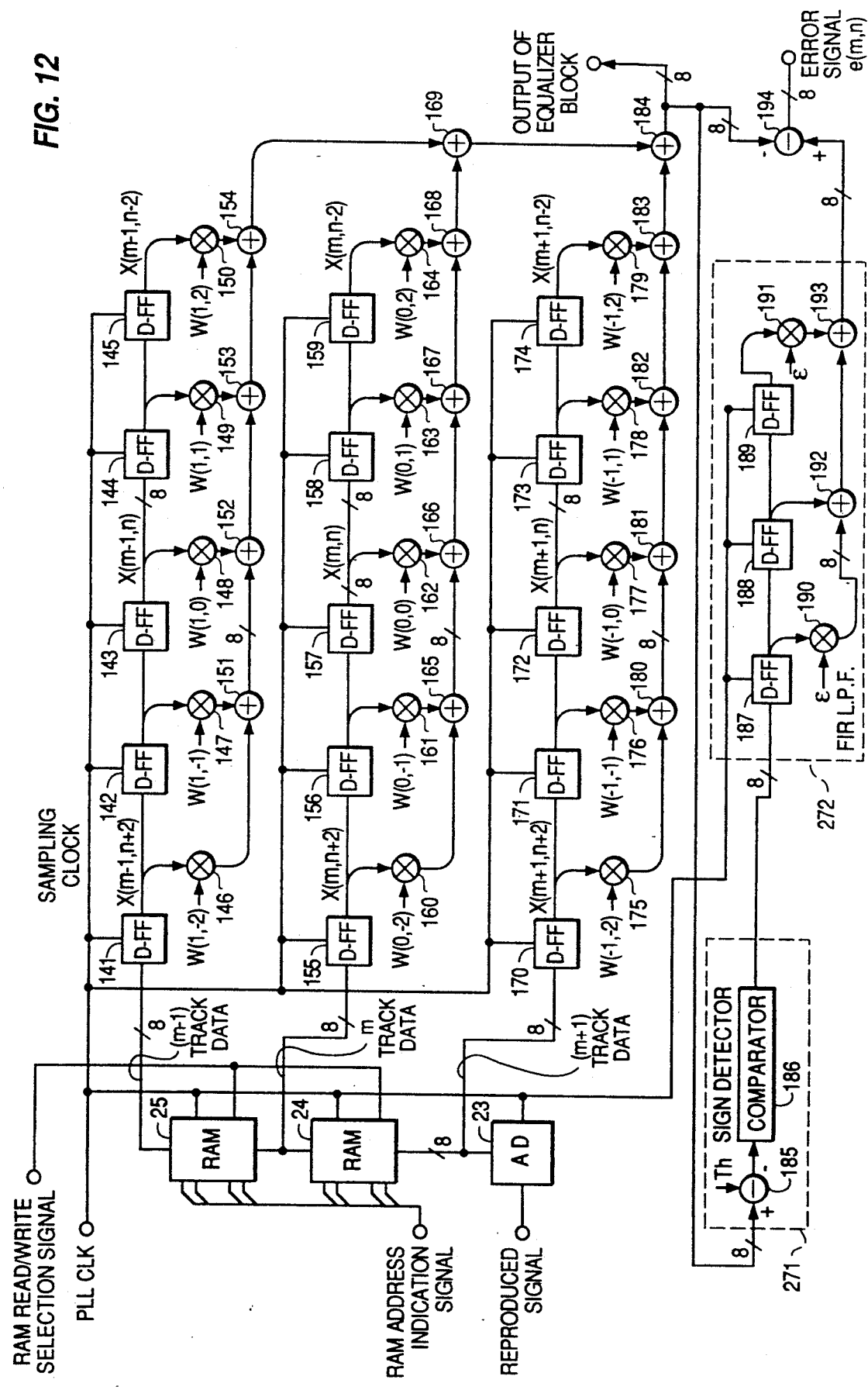
FIG. 12 is a circuit diagram of the second embodiment of the variable coefficient equalizer according to the present invention.

FIG. 12 is a circuit diagram of the second embodiment of the variable coefficient equalizer, and FIG. 13 is a diagram of the coefficient control circuit of the second embodiment of the variable coefficient equalizer.

The variable coefficient equalizer of FIG. 12 includes D-FFs 141-145, 155-159, 170-174, and 187-189, multipliers 146-150, 160-164, 175-179, 190 and 191, adders 151-154, 165- 169, 180-184, 192 and 193, a comparator 186, and subtractors 185 and 194. Reference numeral 271 denotes a sign detector composed of the subtractor 185 and the comparator 186, and its output is represented as $a(m, n)$. Reference numeral 272 denotes a finite impulse response (FIR) low-pass filter composed of the D-FFs 187-189, the multipliers 190 and 191, and the adders 192 and 193. The FIR low-pass filter 272 performs a band limitation of the output signal $a(m, n)$ of the sign detector 271. The coefficient of the multipliers 190 and 191 is $\epsilon$ ($\epsilon > 0$).

In this embodiment, in order to improve the signal to noise ratio, the interference condition in the track is loosened and an FIR low-pass filter for band limitation is inserted after the output $a(m, n)$ of the sign detector 271, the desired signal $d(m, n)$ is set as follows:

$$d(m, n) = \epsilon \cdot a(m, n-1) + a(m, n) + \epsilon \cdot a(m, n+1) \quad (8)$$

where, $\epsilon > 0$.

By the above configuration, the intersymbol interference in the track is reduced with a relatively higher signal to noise ratio and the interference from the adjacent tracks can also be suppressed, and thus, in the case of a narrow track pitch, the reproduced data error rate caused by crosstalk can be reduced. Also, the interference fluctuation attributed to the linear recording density, recording power irregularity, light spot shape, tracking error, etc. is automatically compensated to thereby suppress the equalization error increase caused by such fluctuation. Also, a variable coefficient equalizer which improves the signal to noise ratio in comparison with the first embodiment of the variable coefficient equalizer and an optical disk recording/reproducing apparatus employing such variable coefficient equalizer are realized.

In the case of the DBF, which is the control system of the current optical disk, the reproduced clock timing error during recording and reproducing must be strictly controlled due to the substantial problems associated with fluctuation of the circuit in the optical head 1 (e.g., when, as in the magneto-optical disk apparatus, the reproduction circuit of the clock pit and the reproduction circuit of the magneto-optical data unit are different, the delay time of each circuit becomes irregular or a temperature change may be produced).

However, according to the adaptive tap coefficient matrix compensation of the variable coefficient equalizer, an operation is performed to provide the equalizer with approximately a delay characteristic according to the recording and reproducing conditions. In the first and the second embodiments of the variable coefficient equalizer, the equalizer is a T-spaced linear equalizer where the sampling period is the same as T, so that the effect of this delay compensation is small. Accordingly, by constituting a T/2 spaced linear equalizer for the reproduced clock as the third embodiment of the variable coefficient equalizer, this delay compensation effect can be rapidly increased. (cf. Literature: J. G. Proakis, "Digital Communications", second edition, McGraw-Hill, 1989).

Figure 14A:
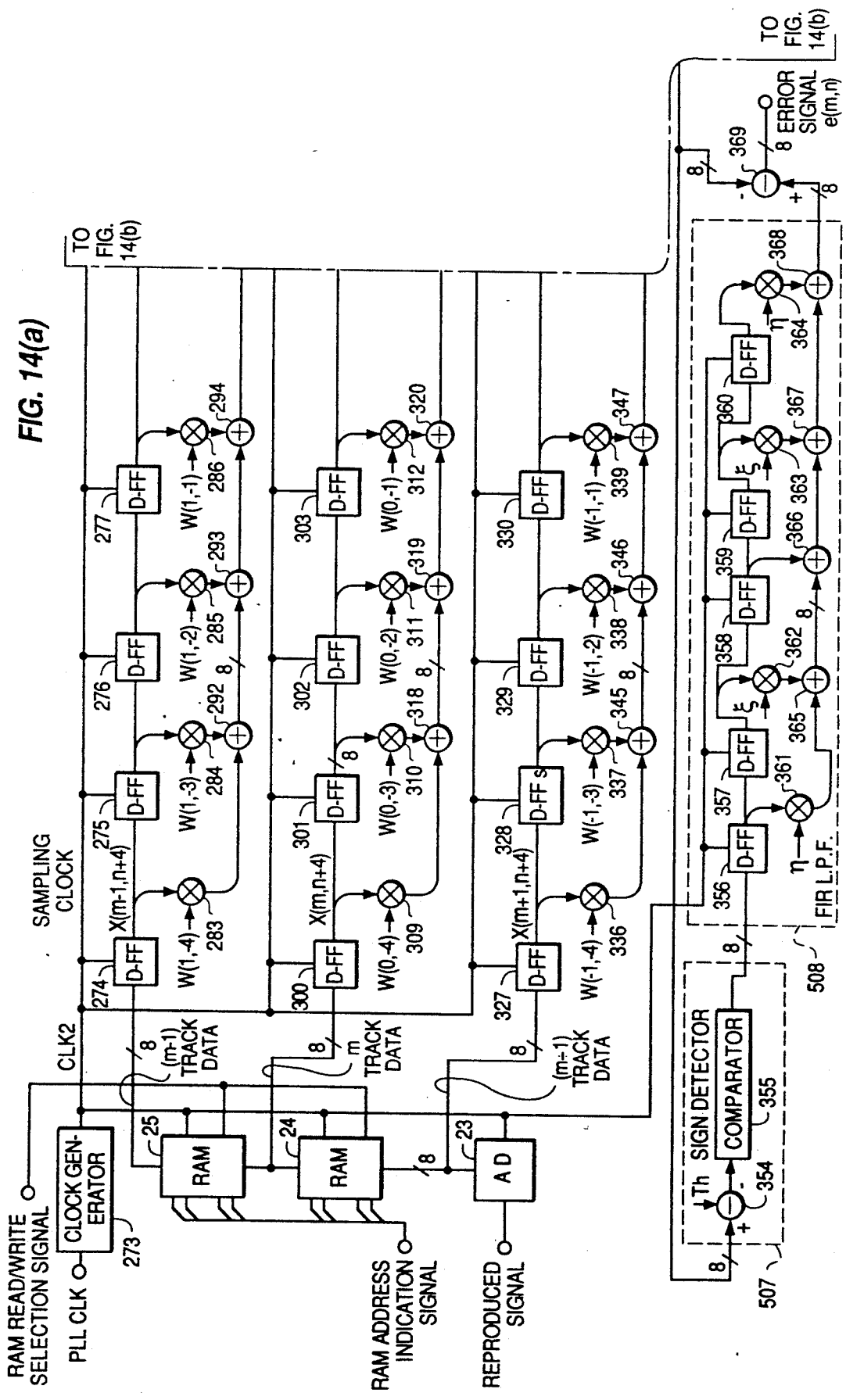
FIGS. 14(a)–(b) constitute a circuit diagram of the third embodiment of the variable coefficient equalizer according to the present invention.
Figure 14B:
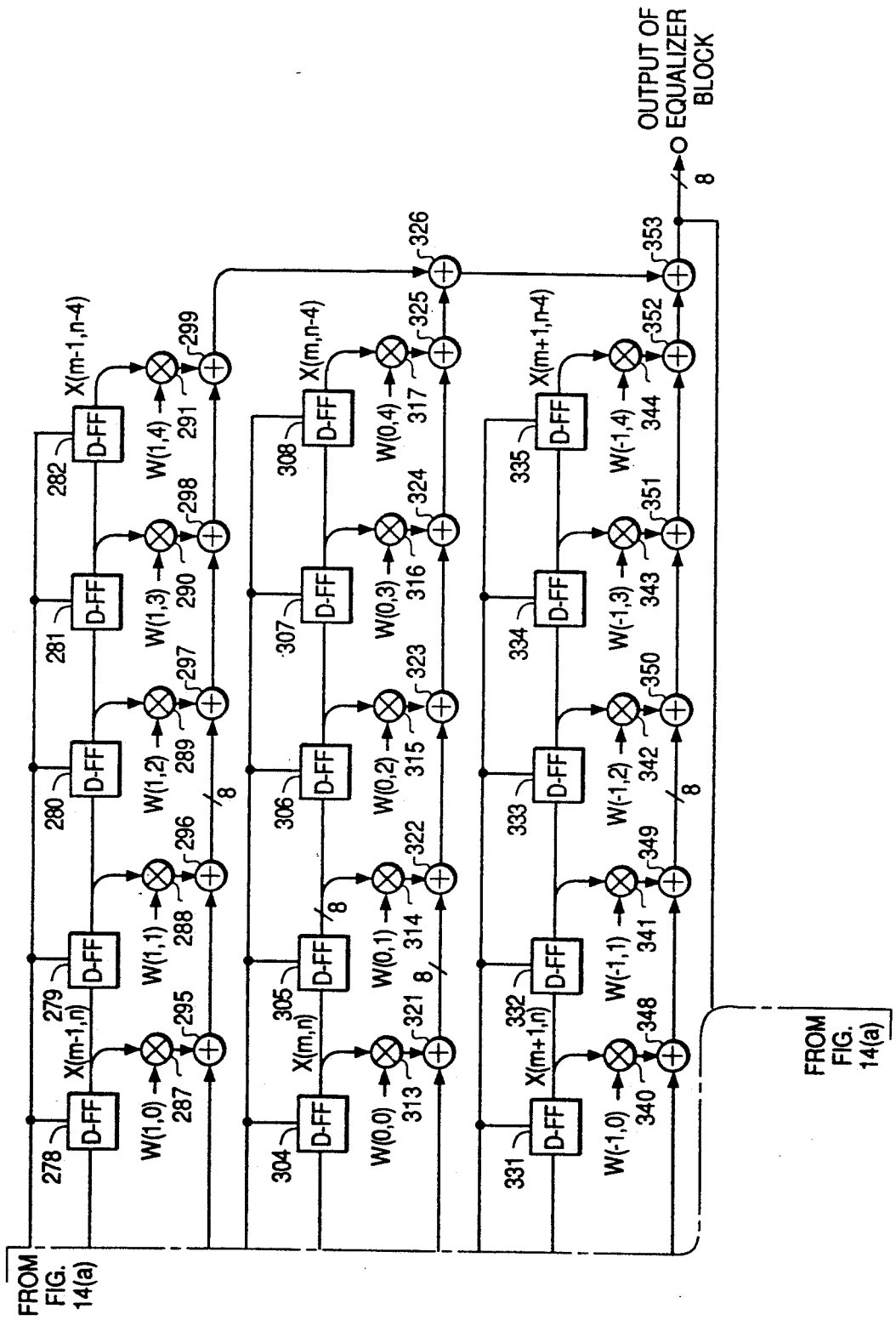
Figure 15A:
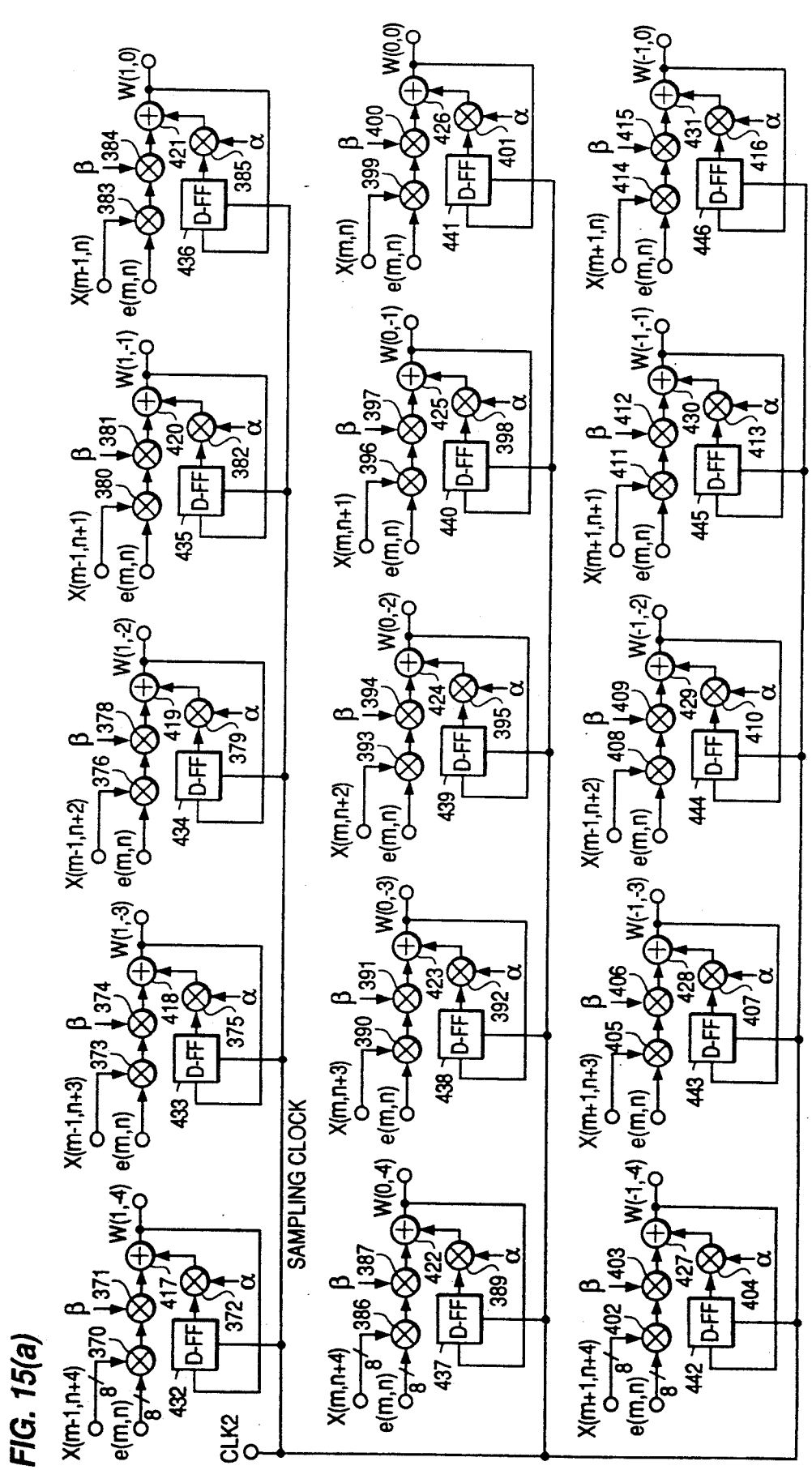
FIG. 15(a) and (b) are circuit diagrams of the coefficient control circuits of the third embodiment of the variable coefficient equalizer according to the present invention.

FIG. 14 shows a circuit diagram of a variable coefficient equalizer of the third embodiment of the present invention, and FIG. 15(a) and (b) are diagrams of the coefficient control circuit of the variable coefficient equalizer of the third embodiment.

The variable coefficient equalizer of FIG. 14 includes D-FFs 274-282, 300-308, 327-335 and 356-360, multipliers 283-291, 309-317, 336-344 and 361-364, and adders 292-299, 318-326, 345-353 and 365-368. The equalization unit is formed of 3×9 taps to double the clock frequency. Reference numeral 273 denotes a clock generator. Reference numeral 507 denotes a sign detector 507 composed of the subtractor 354 and the comparator 355, and its output is represented as $a(m, n)$.

Reference numeral 508 denotes a FIR low-pass filter 508 composed of the D-FFs 356-360, multipliers 361-364 and adders 365-368. The FIR low-pass filter 508 performs a band limitation of the output signal a(m, n) of the sign detector 507. The coefficient of the multipliers 361 and 364 is $\eta$ ($\eta > 0$), and the coefficient of the multipliers 362 and 363 is $\zeta$ ($\zeta > 0$). The FIR low-pass filter 508 has a 5-tap construction to doubly increase the clock frequency.

Figure 15B:
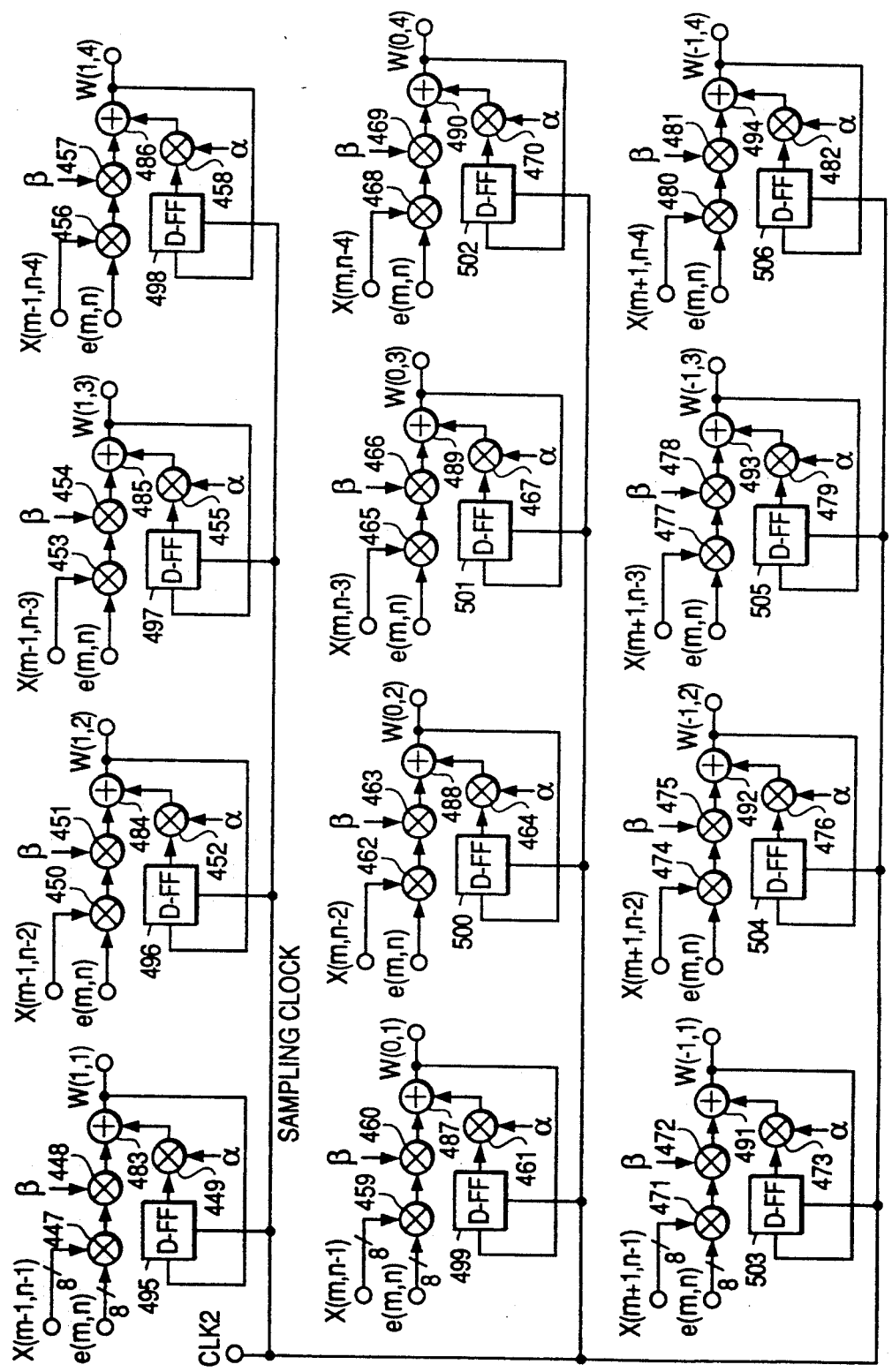

In FIG. 15(a), reference numerals 370-416 denote multipliers, 417-431 denote adders, and 432-446 denote D-FFs. In FIG. 15(b), reference numerals 447-482 denote multipliers, 483-494 denote adders, and 495-506 denote D-FFs. The coefficient control circuits of FIG. 15(a) and (b) function to change over the coefficient matrix W(k, l) of the 3×9 taps of the equalization circuit of FIG. 14.

In FIG. 14, the clock generator 273 generates a clock signal at twice the frequency of the reproducing clock of the phase locked loop circuit 7. The AD converter 23, RAMs 24 and 25, D-FFs shown in FIG. 14, and the D-FFs shown in FIGS. 15(a) and (b) use the clock signal of the clock generator 273 as a sampling clock. In order to obtain an effect similar to that of the variable coefficient equalizer of the second embodiment, the number of taps of the equalizer is 9, and the output y(m, n) of the equalizer is:

$$y(m, n) = \sum_{k=-1}^{1} \sum_{l=-4}^{4} W(k, l) \cdot X(m - k, n - l) \quad (9)$$

Also, each coefficient W(k, l) of the coefficient control circuit in FIGS. 15(a) and (b) is represented by the following equation:

$$W(k,l)^{(n+1)} = W(k,l)^{(n)} + 2 \cdot \mu \cdot e(m,n) \cdot X(m-k, n-l) \quad (10)$$

k = −1, 0, 1 l = −4, −3, ..., 4 where $\mu$ denotes a convergence coefficient ($>0$).

In the actual circuit, $W(k,l)^{(n)}$ is multiplied by $\alpha$ to improve the stability of the circuit. The coefficient ($2 \cdot \mu$) is denoted by $\beta$.

$$0 < \alpha \leq 1, (2 \cdot \mu) = \beta \quad (11)$$

Further, the desired signal d(m, n), which is an output signal of the FIR low-pass filter 508 for band limitation of the sign detector 507, is set as follows:

$$d(m, n) = \zeta \cdot a(m, n-2) + \eta \cdot a(m, n-1) + a(m, n) + \eta \cdot a(m, n+1) + \zeta \cdot a(m, n+2) \quad (12)$$

where, $\eta, \zeta > 0$.

By the above construction, a T/2 spaced linear equalizer for the reproduced clock can be realized.

By the above-mentioned configuration, the interference from the adjacent tracks can be suppressed, and thus, in the case of a narrow track pitch, the reproduced data error rate caused by cross-talk can be reduced. Also, the interference fluctuation attributed to the linear recording density, recording power irregularity, light spot shape, tracking error, etc., is automatically compensated to thereby suppress the increase in equalization error caused by such fluctuation. Also, a variable coefficient equalizer which can automatically and efficiently compensate the clock timing error and fluctuation and an optical disk recording/reproducing apparatus employing such variable coefficient equalizer is realized.

What is claimed is:

1. A data recording/reproducing apparatus for a disk recording medium, comprising:
    recording/reproducing means for recording signals on and reproducing signals from the disk recording medium having formed thereon a plurality of tracks;
    a servo-signal extractor for extracting a servo-signal from a first reproduced signal from said recording-/reproducing means;
    a clock reproducer for extracting a reproducing clock from the first reproduced signal;
    a switch for receiving and selectively outputting one of the first reproduced signal and a second reproduced signal from said recording/reproducing means;
    an equalizer circuit for equalizing in two dimensions an output signal of said switch in both a lengthwise direction and a widthwise direction of a track;
    an address decoder for decoding an address signal from an output of said equalizer circuit; and
    a controller for controlling said switch and said equalizer circuit using an output of said address decoder.

2. A data recording/reproducing apparatus for a disk recording medium, comprising:
    an optical head for recording and reproducing information on an optical disk having formed thereon a plurality of tracks;
    a servo-signal extractor for extracting a servo-signal from a first reproduced signal from said optical head;
    a clock reproducer for extracting a reproducing clock from the first reproduced signal;
    a switch for receiving and selectively outputting one of the first reproduced signal and a second reproduced signal from said optical head;
    an equalizer circuit for equalizing in two dimensions an output signal of said switch in both a lengthwise direction and a widthwise direction of a track;
    an address decoder for decoding an address signal from an output of said equalizer circuit; and
    a controller for controlling said switch and said equalizer circuit using an output of said address decoder.

3. An equalizer apparatus comprising:
    an analog-digital converter for sampling, quantitizing and outputting a reproduced signal from a disk recording medium;
    a memory for storing signal trains of a plurality of tracks outputted from said analog-digital converter; and
    an equalizer circuit for reading out simultaneously the signal trains of the plurality of tracks stored in said memory and for equalizing in two dimensions both a wave interference in a lengthwise direction of a track and a wave interference from an adjacent track.

4. An equalizer apparatus according to claim 3, wherein the sampling rate of the analog-digital converter is equal to the channel bit rate of the reproduced signal.

5. An equalizer apparatus comprising:
    an analog-digital converter for sampling, quantitizing and outputting a reproduced signal from a disk recording medium;

a memory for storing signal trains of a plurality of tracks outputted from said analog-digital converter;

an equalizer circuit for reading out simultaneously the signal trains of the plurality of tracks stored in said memory and for equalizing in two dimensions both a wave interference in a lengthwise direction of a track and a wave interference from an adjacent track;

a sign detector for detecting the sign of a digital signal outputted from said analog-digital converter from an output of said equalizer circuit; and a coefficient control circuit for varying a characteristic of said equalizer circuit so as to minimize errors in the output of said equalizer circuit and an output of said sign detector.

6. An equalizer apparatus according to claim 5, wherein the sampling rate of the analog-digital converter is equal to the channel bit rate of the reproduced signal.

7. An equalizer apparatus comprising:

an analog-digital converter for sampling, quantitizing and outputting a reproduced signal from a disk recording medium;

a memory for storing signal trains of a plurality of tracks outputted from said analog-digital converter;

an equalizer circuit for reading out simultaneously the signal trains of the plurality of tracks stored in said memory and for equalizing in two dimensions both a wave interference in a lengthwise direction of a track and a wave interference from an adjacent track;

a sign detector for detecting the sign of a digital signal outputted from said analog-digital converter from an output of said equalizer;

a Finite Impulse Response low-pass filter for low-pass filtering an output of said sign detector; and a coefficient control circuit for varying a characteristic of said equalizer circuit so as to minimize errors in the output of said equalizer and an output of said Finite Impulse Response low-pass filter.

8. An equalizer apparatus according to claim 7, wherein the sampling rate of the analog-digital converter is equal to the channel bit rate of the reproduced signal.

9. An equalizer apparatus according to claim 7, wherein the sampling rate of the analog-digital converter is twice the channel bit rate of the reproduced signal.

* * * * *